Dec. 12, 1933.                D. W. BERLIN                1,939,100
              AUTOMATICALLY VARIABLE CHANGE SPEED GEAR DEVICE
                      Filed Feb. 8, 1933        4 Sheets-Sheet 1

D. W. Berlin
INVENTOR

By: Marks & Clark
        ATT<u>Y</u>S.

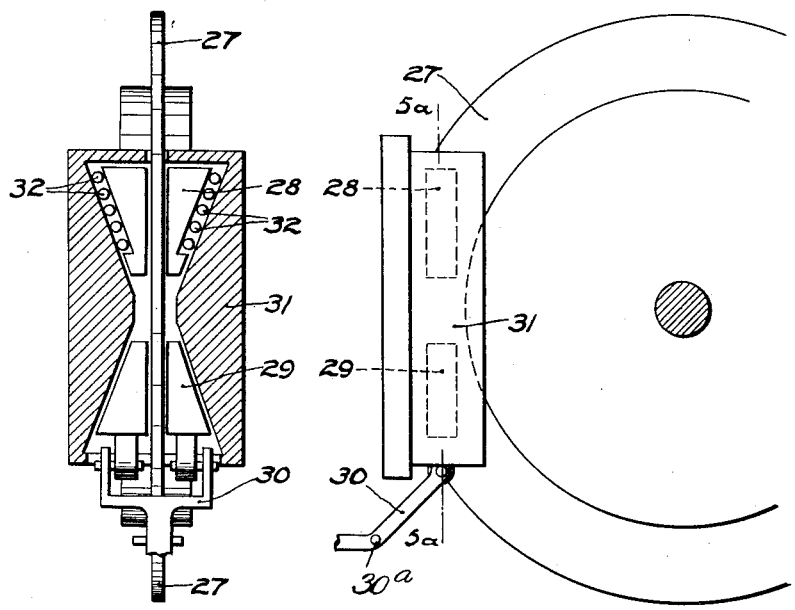
Fig.5.a. Fig.5.
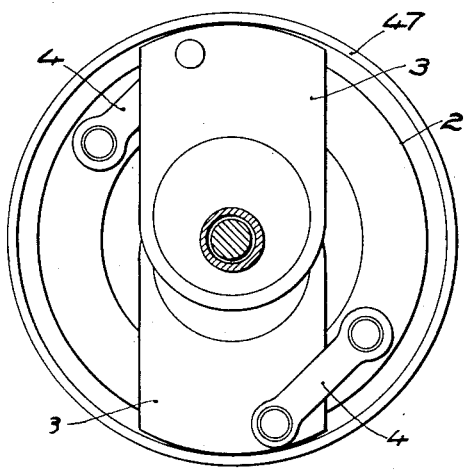
Fig.6.
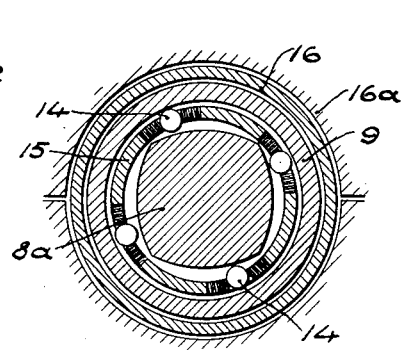
Fig.2.a.

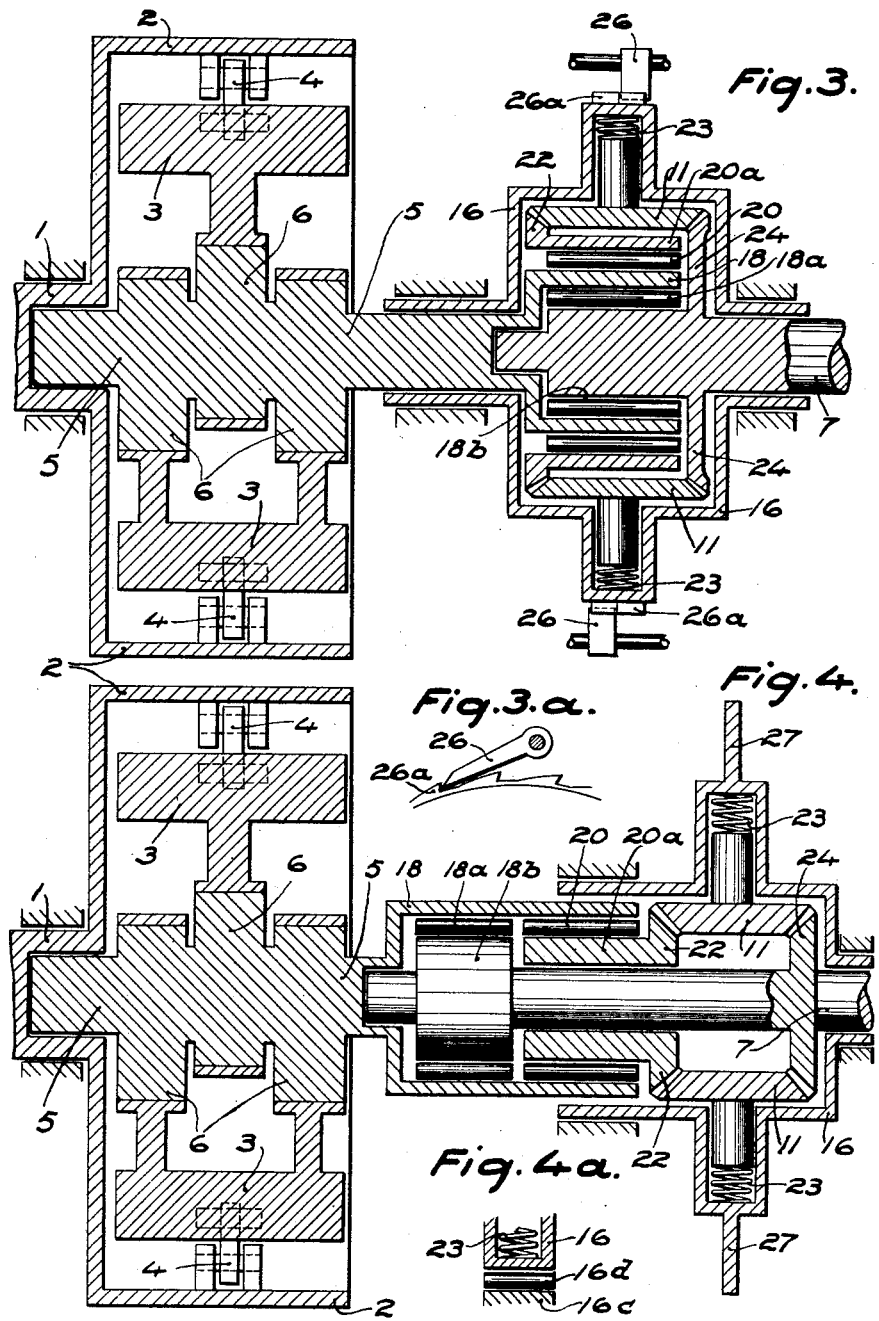

Dec. 12, 1933.  D. W. BERLIN  1,939,100
AUTOMATICALLY VARIABLE CHANGE SPEED GEAR DEVICE
Filed Feb. 8, 1933   4 Sheets-Sheet 4

D. W. Berlin
INVENTOR

By: Mauhs & Clark
Attys.

Patented Dec. 12, 1933

1,939,100

UNITED STATES PATENT OFFICE 1,939,100

AUTOMATICALLY VARIABLE CHANGE SPEED GEAR DEVICE

David Werner Berlin, Rasunda, Sweden

Application February 8, 1933, Serial No. 655,849, and in Sweden September 6, 1932

10 Claims. (Cl. 74—34)

The present invention relates to an automatically variable change speed gear device of the centrifugal weight type, for automobiles and other machines, where the positive period action of the centrifugal weights in the direction of rotation as well as their negative period action in the opposite direction are utilized for obtaining impulses of force which are transmitted to and exert a turning action upon the driven shaft in the positive direction.

In former gear devices according to the centrifugal weight principle it has only been possible to utilize the impulses of the positive and negative periods together in the positive direction during the positive period, which signifies that a turning action is exerted upon the driven shaft only during alternate half revolutions or periods of the centrifugal weights. The inconvenience of this is that the motion of the driven shaft becomes very uneven and that the driven shaft must be provided with heavy fly-weights for utilizing and equalizing the impulse also during the negative part of the revolution. This causes an important disadvantage in operating a vehicle or a machine, driven by such a gear device. The strain of the material in the gear device also will be very important.

The present invention substantially consists therein that an intermediate part or shaft, upon which the centrifugal weights attached to the driving shaft are eccentrically mounted in such a manner as to exert a drawing action upon it, at direct coupling (when the moment of torsion produced by the centrifugal weights because of the centrifugal force is greater than the moment of torsion required to turn the driven shaft the latter is held in direct coupling by the centrifugal weights) rotates in the direction of the driving shaft, with its other transmission members in mutual rest, but at gearing oscillates between the limits of the positive and negative period motions, which limits are determined by the resistance, and preferably both during its forward motion in the direction of rotation and during its backward motion in the opposite direction actuates the driven shaft in the direction of rotation by means of check couplings.

The invention is illustrated in the accompanying drawings.

Figs. 1, 2, 3 and 4 show some constructional forms diagrammatically in longitudinal section.

Fig. 5 shows a part of the construction according to Fig. 4 seen from the right.

Fig. 2a shows a section on line 2a—2a of Fig. 2.

Fig. 5a shows a section on line 5a—5a of Fig. 5.

Figs. 3a and 4a show details.

Figure 7:
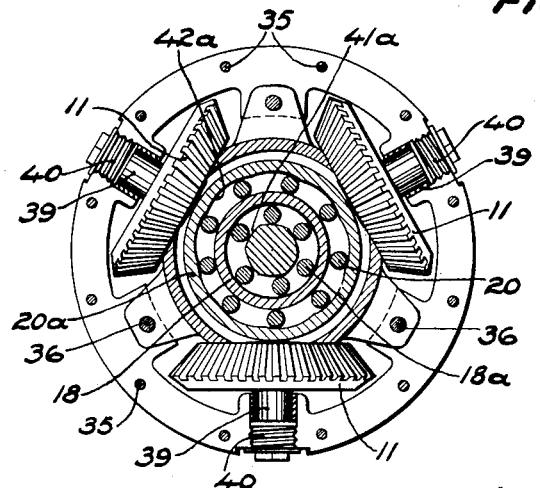
Figure 8:
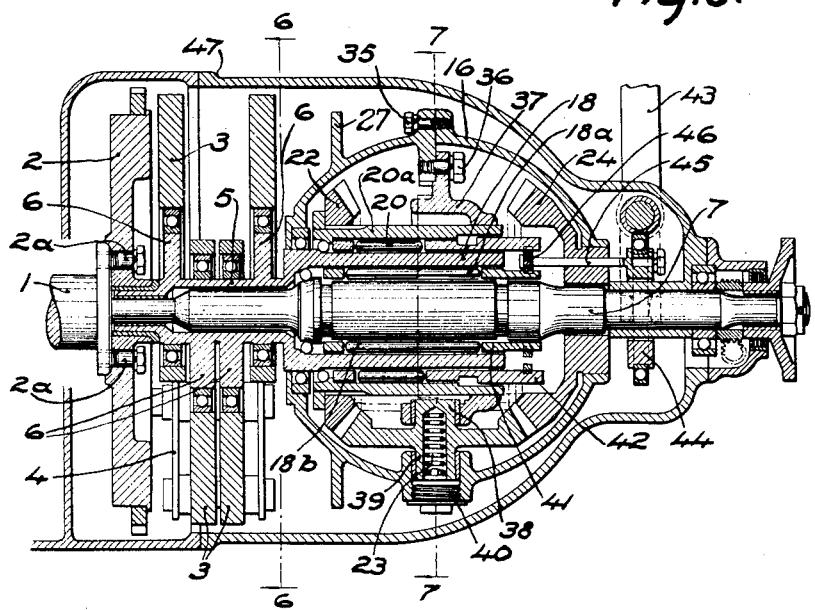

Figs. 6, 7 and 8 show a constructional form, the latter in longitudinal section and Fig. 6 and 7 in sections on lines 6—6 and 7—7 of Fig. 8 respectively.

The following reference numbers and arrangements are common to the constructional forms according to Figs. 1, 2, 3 and 4. The driving shaft 1 is actuated by or transmits the force from the motor or the like. This shaft is provided with a drive member 2 which may be formed as a flyweight and to which the centrifugal weights 3 are connected by means of rods 4, said centrifugal weights being mounted on and carried by eccentrics 6 secured to a sleeve or an intermediate member 5. The intermediate member 5 is in Figs. 1 and 2 formed as a sleeve which is mounted about the driven shaft 7. In the constructions according to Figs. 1 and 2 the shaft 7 is turned in the direction of rotation by the sleeve 5 during the positive period of the centrifugal weights by means of a primary check coupling 8, 8a, 14 and during the negative period of the centrifugal weights the shaft 7 is also turned in the direction of rotation by means of a secondary check coupling 9, 12, 14 through an intermediate transmission member 11. The primary as well as the secondary check coupling consists of three principal parts, namely: the external sleeves 8, 9, the check rollers 14 and the internal drums 8a, 12 secured to the driven shaft 7. The sleeve 5 is at one end, which is remote from the eccentrics, formed to the external sleeve 8 and this in turn to a bevel-wheel (or another motion transmitting member) 10 which through intermediate bevel-wheels (or other motion transmitting members) 11 actuate the secondary check sleeve 9 by means of a bevel-wheel (or another motion transmitting member) 13 secured to said sleeve 9, so that the secondary coupling actuates the driven shaft 7 in the direction of rotation during the negative period of the centrifugal weights.

Figure 1:
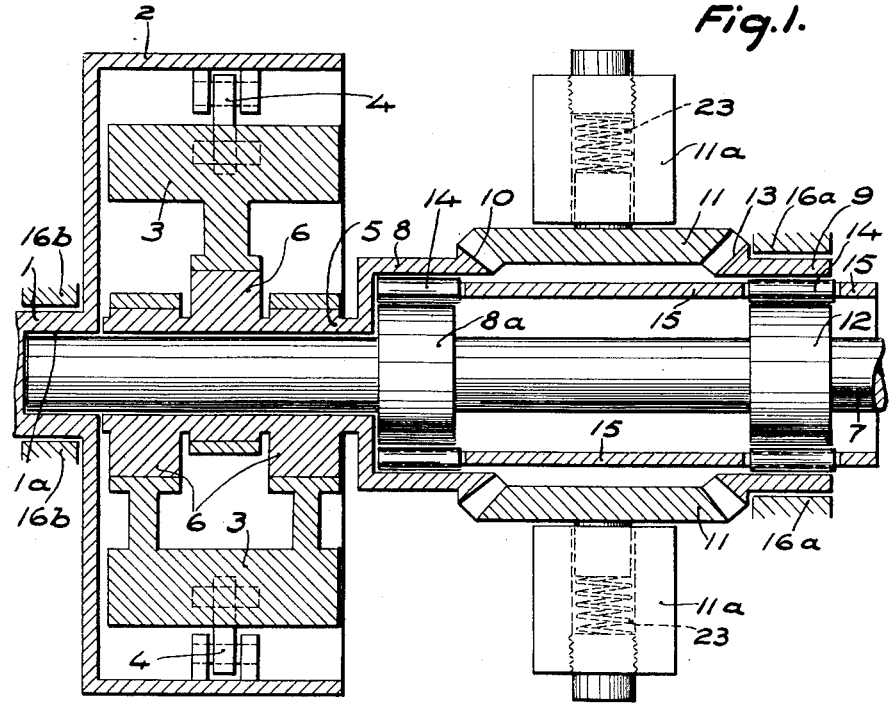

The members 11 serving to transmit the motion from the sleeve 5 to the secondary sleeve 9 during the negative period in such a manner as to actuate the driven shaft 7 in the direction of rotation are either mounted in the casing or frame of the gear-box or in a fly weight, which is then check coupled with respect to the frame. In Fig. 1 the members 1 are mounted in the frame 11a of the gear-box, but in Fig. 2 said members are mounted in a fly weight 16, which is formed to a substantially circular casing enclosing the gears and turnable in bearings 16a on the frame. The fly weight or casing 16 is checked in a suitable manner with respect to the frame, so that the casing can be prevented from moving against the direction of rotation during the gearing operation. At automatic transition from direct coupling to reduced drive the reduced drive takes place during a short time while the casing 16 is at the same time revolving in the direction of rotation, until the kinetic energy of the casing 16 is consumed; then said casing will stop and endeavour to rotate in the opposite direction. This is then to be prevented. In the example shown in Fig. 2 the motion is prevented by means of a brake band 17, which automatically or by manual operation locks the casing 16, and this stops a tendency to move against the direction of rotation. At manual operation of the brake by means of a brake lever or pedal in the case of the casing being locked by a brake this one may be moved forward for forward gearing. Then the check rollers 14 are preferably set into driving position by the same operation for forward running. At reverse running the procedure is of course contrary. The cog wheels or members 11 may be loaded by springs 23 or elastically pressed in any other suitable manner against the cog wheels 10 and 13 for the purpose that the said members 11 should at their movement in one or both directions be in permanent contact with the opposite or answering surfaces, so as to avoid playing or clacking. The driving shaft 1 is mounted in the frame at 16b and the driven shaft 7 is mounted in the driving shaft 1 at 1a and in the frame. The secondary check sleeve 9 is mounted in the frame at 16a and, if desired, also about the shaft 7. When the gear device is to operate only in one direction of rotation the check rollers 14 are stationarily inserted and spring-loaded directly at the check drums on the shaft 7. If on the contrary the gear device is desired to operate in both directions the check rollers 14 are elastically inserted in a sleeve-formed roller holder 15 turnable with respect to the shaft 7 and intended to be turned in one or the other direction in order to bring the check rollers into such position as is required for actuating the shaft 7 in the desired direction.

Figure 2:
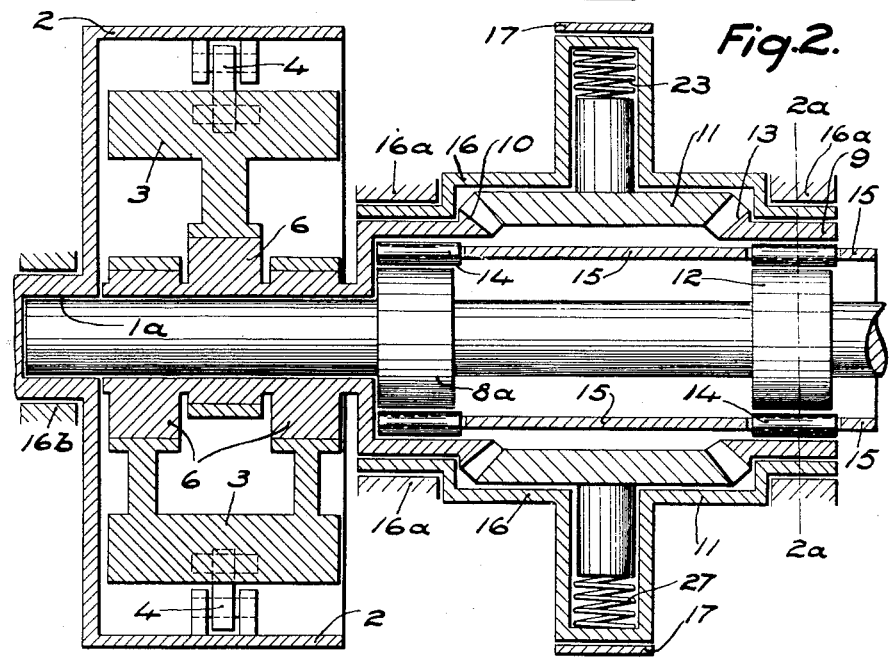

In the example according to Fig. 3 the member 5 is exposed to a turning action in the direction of rotation during the positive period of the centrifugal weights 3 the secondary shaft 7 being rotated in the same direction during this period by means of the check coupling 18, 18a and 18b analogous with the coupling 8, 14 and 8a of Figs. 1 and 2, whilst during the negative period of the centrifugal weights the member 5 is rotated in the opposite direction, the check coupling 18, 20 and 20a then causing the latter, sleeve-formed member 20a also to rotate in the said opposite direction.

The sleeve 20a is provided with a bevel ring (or other member) 22, which then rotates the intermediate bevel wheel or member 11 which in turn causes the shaft 7 to turn in the positive direction by means of the bevel wheel 24 secured to said shaft 7. The example shown in Fig. 4 differs from the foregoing one only therein that the two check couplings are mounted side by side. These two constructional forms offer the advantage that the bevel wheels 22, 11 and 24 only rotate in one direction, whereby the cog pressure is constantly directed against the same surface. This enables the oscillating masses to be reduced, and at the same time the ground for hammering noises, due to varying cog pressure direction, disappears. The intermediate bevel wheels or members 11 are as in Fig. 2 mounted in a fly weight or casing 16 which during reduced drive is prevented from rotating in the opposite direction by means of one or more check devices, which may be constructed as check hooks 26, brakes, check roller devices or check wedge devices. Fig. 3 shows two check hooks 26 effective in opposite directions. Fig. 3a shows a side view of such a check hook. Fig. 4a shows how a check roller device may be arranged. The check hooks 26 and the teeth 26a of the casing are in such a case replaced by rollers inserted between the casing 16 and a fixed part 16c, which may be integral with the frame. The roller shown has the reference number 16d. These check devices are double-acting as shown in Fig. 3, so that they at reverse running also prevent the fly weight 11 from moving in the opposite direction.

In the case of a check wedge device, see Fig. 4, the fly weight is provided with an annular flange 27 which is locked by two wedges 28, Figs. 5 and 5a, acting on either side of it during gearing for forward running and by two other wedges 29 during gearing for reverse running. The wedges 28, 29 are mounted in a box 31 secured to the frame, in the bottom of which box there is provided a slot for the flange 27. When reverse running is desired the wedges 29 are brought into their checking position by an operating member for example in the form of a lever 30 which is turned about a stationary journal 30a. The wedges 28 are automatically working and lock or release the flange 27 in dependence upon the direction in which the casing 16 is turning. In order that these wedges 28 should engage, the friction against the box 31 is reduced for example by means of anti-friction rollers 32 which are constantly brought back into their position by their own weight or by a spring.

The wedges may be spring-loaded and provided with means for mechanically operated release.

Figs. 6, 7 and 8 have the same references as the other figures for the corresponding parts. Thus 1 designates the driving shaft, 2 the drive member for the centrifugal weights 3 which drive member is fastened to the shaft 1 by means of bolts 2a, said centrifugal weights being connected to the drive member by rods 4, 5 is the intermediate shaft, 6 the eccentrics and 7 the driven shaft.

The arrangement of the primary and secondary check coupling is substantially based upon the construction shown in Fig. 3. Thus the device according to Figs. 7 and 8 comprises the primary check coupling 18, 18a and 18b and the secondary check coupling 18, 20 and 20a, further the cog wheel 22, which is secured to the sleeve 20a, and the cog wheel 24 which is carried by the shaft 7. In this example there are three cog wheels 11. The casing 16, in which they are mounted, consists of two parts connected by screw bolts one of which, 35, is shown in Fig. 8. A sleeve-like member 37 fixed within the casing by means of screws 36 is formed as a bearing for the sleeve 20a and the inner axle spindles 38 of the cog wheels 11. The outer axle spindles 39 mounted in the casing 16 are actuated by the springs 23 described above. Each spring is positioned in a bore in the axle spindle for the purpose of reducing the size of the apparatus and is compressed by a screw 40. The holders 41 and 42 of the rollers 18a and 20, are movable with respect to one another. The roller holder 41 rotates synchronically with the shaft 7 which is provided with the usual checking surfaces 41a for the rollers.

The roller holder 42 rotates synchronically with the sleeve 20a the inside of which is provided with checking surfaces 42a co-operating with the rollers. The roller holders are reversed by means of an operating member for obtaining forward and reverse motion of the shaft. If Fig. 8 be assumed to show the apparatus in position for forward motion, reverse motion is obtained by moving the lever 43 to the left thereby displacing a disc 44 on the shaft 7 to the right. A rod 45 passing through the cog wheel 24 then in its turn displaces a ring 46 (in two parts), which engages both roller holders 41, 42, so that these are turned in screw-formed slots or the like (not shown) as much as required in order to move the rollers 18a and 20 to the opposite side of the checking surface thereby enabling reverse motion.

The device shown in Figs. 5 and 5a is intended to be used in this form of construction. For the purpose of simplicity only the flange 27 is shown in Fig. 8.

As the drawings illustrate, ball bearings may be generally used in this constructional form.

The whole apparatus is preferably enclosed in a box 47.

Where the gear device is used in motor cars it is preferably arranged in such a manner that braking by the motor may be effected when driving downhill which braking takes place when the casing 16 is locked for geared reverse travel and the motor is running. The moment of torsion now transmitted from the car to the eccentrics is opposed by the moment of torsion imparted to said eccentrics by the motor through the centrifugal weights.

The invention is not restricted to the forms of construction described the principle of gearing according to this invention being susceptible of different variations in details without the substance of the invention losing its character of a true principal invention.

Having now described my invention, what I claim as new and desire to secure by Letters Patent is:

1. An automatically variable change speed gear device including a drive shaft, an intermediate shaft, a driven shaft, eccentrics on said intermediate shaft, centrifugal weights carried by and rotating with said drive shaft and coacting with said eccentrics to exert a turning influence thereon, a primary check coupling connecting the driven shaft with the intermediate shaft and transmitting a rotary movement of the latter in one direction to the driven shaft, a secondary check coupling associated with the driven shaft, and coacting motion transmitting members connecting the driven shaft with the secondary check coupling to rotate the driven shaft when the intermediate shaft rotates in the opposite direction, one of said connecting members being provided directly on said intermediate shaft.

2. An automatically variable change speed gear device including a drive shaft, an intermediate shaft, a driven shaft, eccentrics on said intermediate shaft, centrifugal weights carried by and rotating with said drive shaft and coacting with said eccentrics to exert a turning influence thereon, a primary check coupling connecting the driven shaft with the intermediate shaft and transmitting rotary movement of the latter in one direction to the driven shaft, a secondary check coupling associated with the driven shaft, a casing rotatable about the axis of the shafts, and coacting motion transmitting members connecting the driven shaft with the secondary check coupling to rotate the driven shaft when the intermediate shaft rotates in the opposite direction, one of said connecting members being mounted for rotary movement in said rotatable casing.

3. An automatically variable change speed gear device including a drive shaft, an intermediate shaft, a driven shaft, eccentrics on said intermediate shaft, centrifugal weights carried by and rotating with said drive shaft and coacting with said eccentrics to exert a turning influence thereon, a primary check coupling connecting the driven shaft with the intermediate shaft and transmitting rotary movement of the latter in one direction to the driven shaft, a secondary check coupling associated with the driven shaft, a casing rotatable about the axis of the shafts, coacting motion transmitting members connecting the driven shaft with the secondary check coupling to rotate the driven shaft when the intermediate shaft rotates in the opposite direction, one of said connecting members being mounted for rotary movement in said rotatable casing, and means for locking said casing against rotary movement.

4. An automatically variable change speed gear device including a drive shaft, an intermediate shaft, a driven shaft, eccentrics on the intermediate shaft, centrifugal weights carried by and rotating with said drive shaft and coacting with said eccentric to exert a turning influence thereon, a primary check coupling connecting the driven shaft with the intermediate shaft and transmitting rotary movement of the latter in one direction to the driven shaft, a secondary check coupling arranged about the first mentioned check coupling and coacting with said intermediate shaft when the latter rotates in the opposite direction, motion transmitting members connecting the secondary check coupling with the driven shaft, and a rotatable casing supporting the said members.

5. An automatically variable change speed gear device including a drive shaft, an intermediate shaft, a driven shaft, eccentrics on the intermediate shaft, centrifugal weights carried by and rotating with said drive shaft and coacting with said eccentrics to exert a turning influence thereon, a primary check coupling connecting the driven shaft with the intermediate shaft and transmitting rotary movement of the latter in one direction to the driven shaft, a secondary check coupling arranged about the first mentioned check coupling and coacting with said intermediate shaft when the latter rotates in the opposite direction, motion transmitting members connecting the secondary check coupling with the driven shaft, a rotatable casing supporting the said members, and releasable means to lock said casing.

6. An automatically variable change speed gear device including a drive shaft, an intermediate shaft, a driven shaft, eccentrics on said intermediate shaft, centrifugal weights carried by and rotating with said drive shaft and coacting with said eccentrics to exert a turning influence thereon, a primary check coupling connecting said driven shaft with the intermediate shaft and transmitting rotary movement of the latter in one direction to the driven shaft, a secondary check coupling actuated in response to rotation of the intermediate shaft in the opposite direction, and coacting motion transmitting members connecting the secondary check coupling with the driven shaft, said primary and secondary check couplings being arranged side by side in the direction of the longitudinal axis of said shafts, and a casing rotatably supporting said main transmitting members.

7. Automatically variable change speed gear device as claimed in claim 2, characterized in that said motion transmitting members are constituted by gear wheels, the gear wheel mounted in said casing being spring-pressed.

8. Automatically variable change speed gear device as claimed in claim 1, characterized by the provision of a support for the drive shaft and the secondary clutch coupling, said driven shaft being rotatably mounted in the drive shaft.

9. Automatically variable change speed gear device as claimed in claim 1, characterized in that said primary and secondary check couplings include a sleeve member rotatable relatively to said shafts, check rollers mounted in said sleeve member and spring means normally maintaining the said rollers in operative position.

10. Automatically variable change speed gear device as claimed in claim 2, characterized by the provision of manually controlled means to automatically lock said casing against rotation.

DAVID WERNER BERLIN.